United States Patent
Do et al.

(10) Patent No.: US 11,855,405 B2
(45) Date of Patent: Dec. 26, 2023

(54) DEVICE AND METHOD FOR ADJUSTING LASER PULSE WIDTH USING LASER-INDUCED PLASMA SHUTTER

(71) Applicant: Seoul National University R&DB Foundation, Seoul (KR)

(72) Inventors: Hyung Rok Do, Seoul (KR); Sang Eun Bae, Seoul (KR); Sung Kyun Oh, Seoul (KR)

(73) Assignee: Seoul National University R&DBFoundation, Seoul (KR)

( * ) Notice: Subject to any disclaimer, the term of this patent is extended or adjusted under 35 U.S.C. 154(b) by 1092 days.

(21) Appl. No.: 16/663,359

(22) Filed: Oct. 25, 2019

(65) Prior Publication Data

US 2020/0244028 A1 Jul. 30, 2020

(30) Foreign Application Priority Data

Jan. 30, 2019 (KR) .................. 10-2019-0012133

(51) Int. Cl.
| | |
|---|---|
| *H01S 3/00* | (2006.01) |
| *G02B 27/09* | (2006.01) |
| *G02B 27/10* | (2006.01) |
| *G02F 1/35* | (2006.01) |
| *H01S 3/10* | (2006.01) |
| *H05H 1/46* | (2006.01) |

(52) U.S. Cl.
CPC ........ *H01S 3/0057* (2013.01); *G02B 27/0905* (2013.01); *G02B 27/10* (2013.01); *G02F 1/3503* (2021.01); *G02F 1/3505* (2021.01); *G02F 1/3507* (2021.01); *G02F 1/3511* (2013.01); *G02F 1/3515* (2013.01); *G02F 1/3523* (2013.01); *H01S 3/0085* (2013.01); *H05H 1/46* (2013.01); *H01S 3/10092* (2013.01)

(58) Field of Classification Search
None
See application file for complete search history.

(56) References Cited

U.S. PATENT DOCUMENTS

| | | | |
|---|---|---|---|
| 10,069,564 B2 * | 9/2018 | Hening | G02B 27/10 |
| 2018/0331489 A1 * | 11/2018 | Suckewer | H01S 3/302 |
| 2019/0103720 A1 * | 4/2019 | Froula | H01S 3/09716 |

FOREIGN PATENT DOCUMENTS

| | | |
|---|---|---|
| KR | 10-2018-0052867 A | 5/2018 |
| KR | 10-1900413 B1 | 9/2018 |

OTHER PUBLICATIONS

C.G. Morgan, "Laser-induced breakdown of gases", 1975 Rep. Prog. Phys. 38 621.
Notice of Allowance dated Feb. 17, 2020 for Korean Application No. 10-2019-0012133.

* cited by examiner

*Primary Examiner* — Eric L Bolda
(74) *Attorney, Agent, or Firm* — Insight Law Group, PLLC; Seung Lee

(57) ABSTRACT

The present disclosure relates to a device and a method for adjusting a pulse width of a laser beam by using the plasma generated by being induced from laser as a shutter, and more particularly, to a device and a method for adjusting a laser pulse width, which can precisely and quickly adjust the laser pulse width by dividing the laser generated from a laser light source into a target pulse and a shutter pulse; converting the optical path of the divided laser; and chopping the target pulse by using the plasma induced from the shutter pulse as an optical shutter in a cell having adjustable internal pressure.

20 Claims, 8 Drawing Sheets

DEVICE AND METHOD FOR ADJUSTING LASER PULSE WIDTH USING LASER-INDUCED PLASMA SHUTTER

CROSS-REFERENCE TO RELATED APPLICATION

This application claims priority to Korean Patent Application No. 10-2019-0012133, filed on Jan. 30, 2019, which is incorporated herein by reference in their entirety.

BACKGROUND OF THE DISCLOSURE

Field of the Disclosure

The present disclosure relates to a device and a method for adjusting a pulse width of a laser beam by using the plasma induced and generated by a laser as a shutter.

Description of Related Art

Laser is a high-tech and high-value-added technology globally used in a wide variety of industries, such as ultra-precision machining process field, a medical field, a communication field, a defense field, and a measurement field. Generally, the high-output laser in the form of a pulse oscillates at a fixed time width between 10 and 1000 nanoseconds.

In order to cause the target photon-material interaction such as ablation, ultra-fast heating, ionization, chemical reaction induction, it is necessary to determine the characteristics of a laser light source to be irradiated according to the characteristics of the target material. For example, it is important to prevent deformation or deterioration of the surrounding region due to heat generation during the ablation induction for an ablation machining for ablating a part of the surface of the object, and for this purpose, the laser having the minimum pulse width of a picosecond or femtosecond unit finishing laser radiation before the generation of thermal energy should be used. That is, only a specific laser having the minimum pulse width should be used for ultra-precision ablation machining. However, since a conventional picosecond or femtosecond laser is obtained through a mode-locking method of a Ti: Sapphire laser, there is a problem that photons are generated in a wide wavelength region, thereby losing the advantage of a single wavelength of a general laser light source. In addition, there is a problem in that the high-output picosecond or femtosecond short-pulsed laser in the laser market is limited in application because the oscillation wavelength and width of the pulse are fixed, and in addition, the amount of money required to purchase the picosecond or femtosecond short-pulsed laser is close to twice that required to purchase the nanosecond short-pulsed laser, such that there has a large cost burden to prepare separate equipment having different pulse widths.

In general, it has been known that it is difficult to control the main characteristics after the laser beam is emitted, regardless of the type according to the active medium of the laser or the driving system. Conventionally, a mechanical shutter or an optical element has been mainly used to control the characteristics of laser, but there is a problem in that this cannot fundamentally affect the reaction time region of the photons without mass. For example, there is a problem in that since all control and measurement equipments operating through an electrical signal depend upon the movement of electrons with mass, that is, an electrical signal, it cannot avoid the control delay of the nanosecond unit required for signal transfer. That is, upon the chopping of the conventional nanosecond laser, the shutter speed of the picosecond or femtosecond unit shorter than the nanosecond is needed, and there has been a problem in that since the electrical signal is a nanosecond unit in the case of using the electrical signal, it is difficult to implement the picosecond or femtosecond shutter speed required for the laser chopping. In addition, there is a problem in that when the optical elements such as a wave-plate, a polarizer, and a beam expander are used, the kinds of laser characteristics that can be controlled are largely limited.

Meanwhile, when the laser pulse is focused, laser-induced plasma can be generated when the power density at the focal point exceeds a threshold. At this time, the threshold is changed according to the focus, the focal length of the focus lens, the characteristics of the laser pulse, and the characteristics of the plasma forming material.

RELATED ART DOCUMENTS

Patent Document (Patent Document 0001) KR 101900413 B1

Non-Patent Document (Non-Patent Document 0001) Morgan, C. G., Rep. Prog. Phys 38 (1975)

SUMMARY OF THE DISCLOSURE

The present disclosure is intended to solve the problems, and an object of the present disclosure is to provide a device and a method capable of freely adjusting the laser pulse width by being applied to the conventional single-wavelength laser device of the nanosecond or less.

According to one aspect of the present disclosure, provided is a device for adjusting a laser pulse width including a beam splitter for dividing the laser generated from a laser light source into a target pulse and a shutter pulse; an optical path conversion unit capable of converting the optical path of the target pulse or the shutter pulse so that the path of the target pulse and the path of the shutter pulse intersect each other; a plasma forming unit having adjustable internal pressure, and disposed at a point where the target pulse and the shutter pulse meet each other and capable of forming the plasma induced from the shutter pulse to adjust the pulse width of the target pulse; and a focusing unit disposed on the path of the shutter pulse, and for focusing the shutter pulse so that the plasma induced from the shutter pulse is formed within the plasma forming unit.

In addition, the plasma forming unit can chop the target pulse to adjust the pulse width by the target pulse activating the inverse-Bremsstrahlung photon absorption propagation-induced within the plasma therein.

In addition, the laser generated from the laser light source can be stabilized through an injection seeding.

In addition, the plasma forming unit can be a pressure cell.

In addition, transparent fluid can flow into and flow out from the plasma forming unit.

In addition, the device for adjusting the laser pulse width can further include a light amount adjustment unit for continuously adjusting the light amount of the laser generated from the laser light source, and the continuously changeable focusing energy can be supplied to the plasma forming unit while equally keeping the laser characteristics with the light amount adjustment unit and the beam splitter.

In addition, the device for adjusting the laser pulse width can further include a saturable absorber disposed on the path of the target pulse, and disposed to be passed through by the target pulse before or after passing through the plasma forming unit.

According to another aspect of the present disclosure, provided is a device for adjusting a laser pulse width including at least one beam splitter for dividing the laser generated from a laser light source into a target pulse, a first shutter pulse, and a second shutter pulse; a first optical path conversion unit for intersecting the paths of the first shutter pulse and the target pulse, and capable of converting the optical path of the target pulse so that the optical path of the first shutter pulse is shorter than the optical path of the target pulse; a second optical path conversion unit for intersecting the paths of the second shutter pulse and the target pulse, and capable of converting the optical path of the second shutter pulse so that the optical path of the second shutter pulse is longer than the optical path of the target pulse; a first plasma forming unit having adjustable internal pressure, disposed at a point where the target pulse and the first shutter pulse meet each other, and capable of forming the plasma induced from the first shutter pulse to chop the first half of the target pulse; a second plasma forming unit having adjustable internal pressure, disposed at a point where the target pulse and the second shutter pulse intersect each other, and capable of forming the plasma induced from the second shutter pulse to chop the second half of the target pulse; a first focusing unit disposed on the path of the first shutter pulse, and for focusing the first shutter pulse so that the plasma induced from the first shutter pulse is formed within the first plasma forming unit; and a second focusing unit disposed on the path of the second shutter pulse, and for focusing the second shutter pulse so that the plasma induced from the second shutter pulse is formed within the second plasma forming unit.

In addition, the first plasma forming unit and the second plasma forming unit can chop the target pulse to adjust the pulse width by the target pulse activating the inverse-Bremsstrahlung photon absorption propagation-induced within the plasma therein.

In addition, the laser generated from the laser light source can be stabilized through an injection seeding.

In addition, the first plasma forming unit and the second plasma forming unit can be pressure cells.

In addition, transparent fluid can flow into and flow out from the first plasma forming unit and the second plasma forming unit.

In addition, the device for adjusting the laser pulse width can further include a light amount adjustment unit for continuously adjusting the light amount of the laser generated from the laser light source.

In addition, the device for adjusting the laser pulse width can further include a saturable absorber disposed on the path of the target pulse.

According to still another aspect of the present disclosure, provided is a method for adjusting a laser pulse width including a first stage dividing the laser generated from a laser light source into a target pulse and at least one shutter pulse; a second stage converting the optical paths of the target pulse or the shutter pulse so that the path of the target pulse and the path of the shutter pulse intersect each other; a third stage forming plasma induced from the shutter pulse at a point where the target pulse and the shutter pulse meet each other; and a fourth stage chopping the target pulse with the plasma and adjusting a pulse width.

In addition, the fourth stage can be performed by the target pulse activating the inverse-Bremsstrahlung photon absorption propagation-induced within the plasma.

In addition, the laser generated from the laser light source can be stabilized through an injection seeding.

In addition, the third stage and the fourth stage can be performed in the environment where pressure is adjusted.

In addition, the third stage and the fourth stage can be performed in the environment where transparent fluid flows into and flows out.

In addition, the target pulse can pass through a saturable absorber before and after being chopped with the plasma to be additionally chopped to adjust the pulse width.

Since the device for adjusting the laser pulse width according to an embodiment of the present disclosure performs the control of the shutter by only the optical signal without the electrical signal by using the laser-induced generated plasma as the shutter, it can chop the laser pulse width at the fast response speed. Therefore, it is possible to precisely and actively control the pulse width and energy of various single-wavelength lasers of high energy.

In addition, it is possible to shorten the laser pulse width, thereby preventing the rapid temperature rise of the measurement or machining object material irradiated by laser. Therefore, it is possible to perform the precise measurement or machining while minimizing the deterioration of the measurement or machining object material.

In addition, as the device that can be additionally mounted to the conventional laser device, it is possible to be applied to the conventional laser device, thereby shortening the pulse width unit of the laser at the fast response speed. Therefore, it is possible to generate the picosecond laser in the nanosecond laser device or generate the femtosecond laser in the picosecond laser device, thereby increasing the value-added of the conventional laser device.

DESCRIPTION OF SPECIFIC EMBODIMENTS

Figure 1:
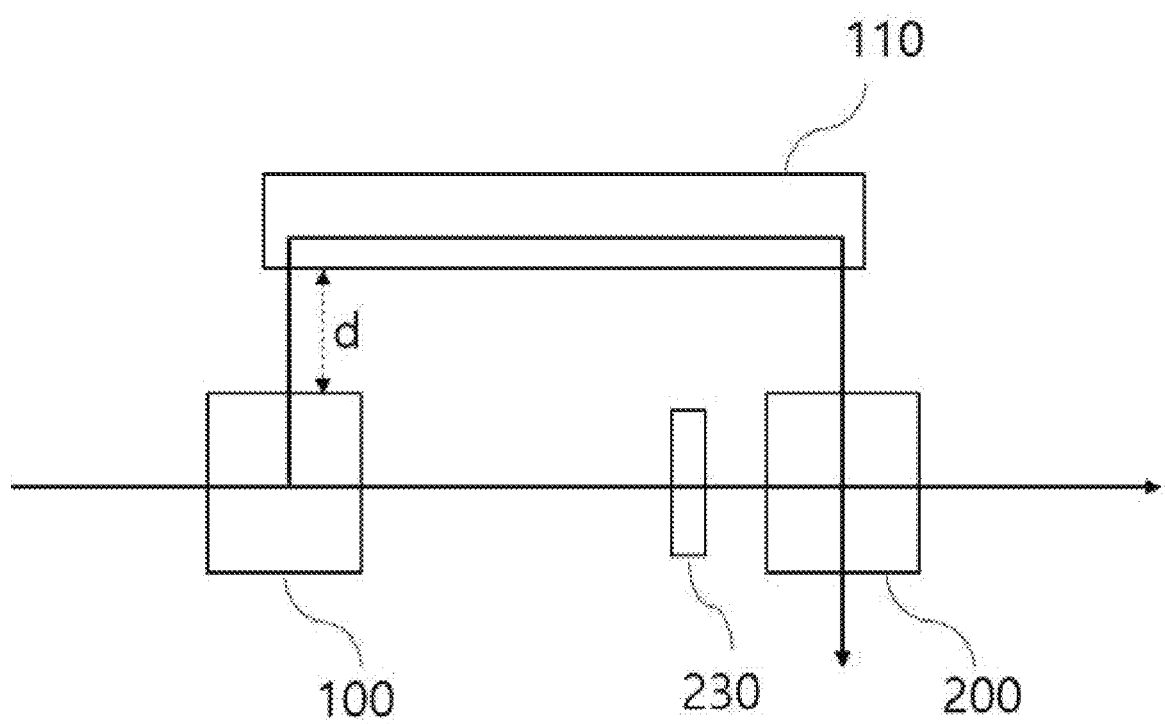
FIG. 1 is a diagram showing a configuration of a device for adjusting a laser pulse width according to an embodiment of the present disclosure.

According to an aspect of the present disclosure, provided is a device for adjusting a laser pulse width. Hereinafter, an embodiment of a device for adjusting a laser pulse width according to the present disclosure will be described in detail with reference to the accompanying drawings.

In an embodiment of the present disclosure, a control of the laser pulse width is performed by chopping the laser by using plasma as a shutter. This is to use the inverse-Bremsstrahlung (hereinafter referred to as 'IB') phenomenon in which electrons in plasma absorb photon energy quickly as a shutter for laser chopping. The generation timing of the IB phenomenon, the disappearing time, the size and shape of the IB-induced plasma, and the electron density are determined by the characteristics including the type, pressure, temperature, density, and concentration of the material that generates plasma, and the IB quickly absorbs the photon energy of the laser to scatter and interrupt the laser beam transmission through the fluid. The focusing plasma generated by the initial multi-photon ionization (hereinafter referred to as 'MPI') phenomenon before the generation of the IB is heated by the IB phenomenon induced by the absorption of the fast photon energy of the initial electron, and therefore, the electron density rises sharply, and at this time, the electron and the material heated by the IB process instantly absorbs or scatters most of the photon energy passing through this region. Therefore, the plasma heated by the IB phenomenon can instantly block the laser beam such as the ultra-high speed shutter. A constant time is required to cause the IB phenomenon in the neutral material (Photon Absorption Delay, hereinafter referred to as PAD), and this PAD largely depends on the nature of the material in which the focusing plasma is generated.

When the operation of a passive shutter that generates a plasma shutter (PS) by itself by using a single condensed laser beam and blocks the laser beam after the PAD is performed, the PAD for determining the laser pulse width can be changed only by depending upon the nature of the material in which plasma is generated. Therefore, since the density of electrons generated by the MPI is low, it is not possible to operate the shutter in the initial time region of the laser pulse in which the IB is not generated, thereby having the limitation of reducing the full-width half maximum (hereinafter referred to as FWHM) of the laser pulse, and in this case, the minimum FWHM can remain at the level of tens to hundreds of picoseconds if there is no injection seeding described later. The present disclosure operates the plasma shutter (PS) by using two splitted laser beams in order to overcome the operating limitation of the single laser beam plasma shutter (PS). In explaining the present disclosure, the laser beam splitted at this time is divided into a target pulse (TP) and a shutter pulse (SP). Herein, the target pulse (TP) means a laser whose pulse width is controlled, and the shutter pulse (SP) means a laser that forms plasma for chopping the target pulse (TP). In the circumference capable of changing the characteristics of the material for forming plasma, it is possible to condense the shutter pulse (SP) to form the plasma shutter (PS), and passing through the target pulse (TP) at its position, thereby performing the control of the target pulse (TP). Therefore, it is possible to relatively change only the optical paths of two laser beams without using the electrical signal having the delay time of the nanosecond unit, thereby precisely adjusting the generation time of the plasma shutter (PS) and the arrival time of the target pulse (TP) by the IB phenomenon. At this time, the operation time of the plasma shutter (PS) can be controlled in units of femtoseconds. Therefore, the device for adjusting the laser pulse width according to an embodiment of the present disclosure can use the ultra-fast speed plasma shutter, thereby chopping the laser pulse width by using the optical characteristics of the plasma generated, kept, and disappeared according to an input signal of the photon at a fast response speed of femtoseconds or less, and precisely and actively controlling the pulse width and the energy of various single-wavelength lasers of high energy. When using the device according to an embodiment of the present disclosure, it is possible to shorten the pulse width without changing the generated energy of the laser itself.

Figure 2:
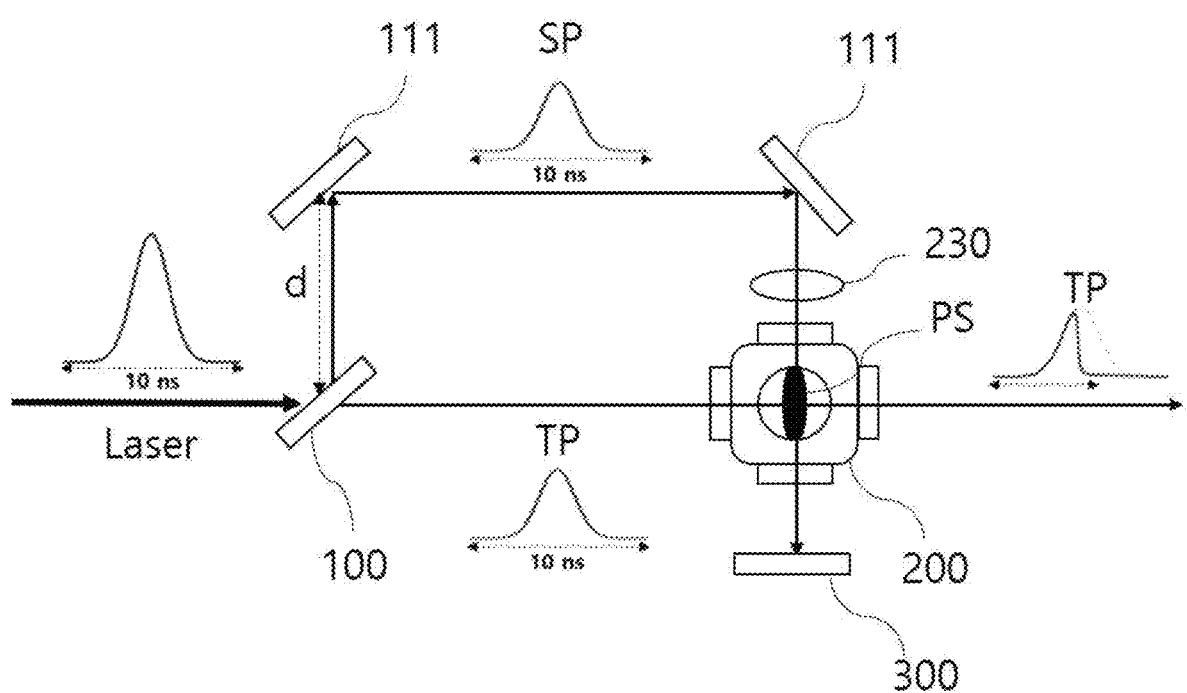
FIG. 2 is a diagram showing a structure of the device for adjusting the laser pulse width according to an embodiment of the present disclosure for chopping the second half of the laser pulse.
Figure 3:
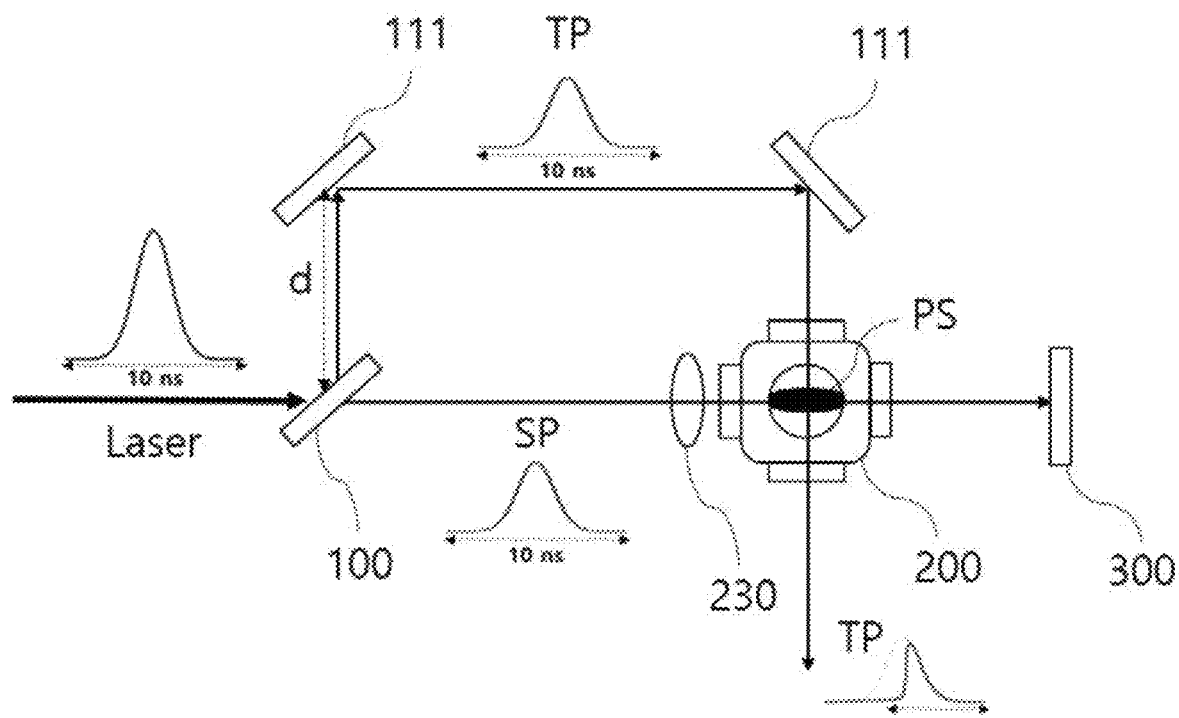
FIG. 3 is a diagram showing a structure of the device for adjusting the laser pulse width according to an embodiment of the present disclosure for chopping the first half of the laser pulse.

FIG. 1 is a diagram showing a configuration of a first embodiment of a device for adjusting the laser phase width according to the present disclosure. FIGS. 2 and 3 are diagrams showing a structure of the first embodiment of the device for adjusting the laser phase width according to the present disclosure for chopping the first half or the second half of the laser pulse. Through the device for adjusting the laser phase width according to the present disclosure, the first half or the second half of the laser pulse can be chopped by the plasma so that the laser pulse width can be adjusted. Herein, the first half or the second half of the pulse can be divided based on the peak center of the pulse.

The first embodiment of the device for adjusting the laser width according to the present disclosure is for adjusting the laser by being applied to the laser generating device for generating laser, and referring to FIGS. 1 to 3, includes a beam splitter 100; an optical path converting unit 110; a plasma forming unit 200; and a focusing unit 230.

The laser for adjusting the pulse width can be generated by being emitted from a laser light source (not shown) of a separate external device. Alternatively, the device for adjusting the laser pulse width according to the present embodiment can further include a laser light source (not shown) for generating laser, and can also be formed by being generated therefrom. The laser output from the laser light source (not shown) can be a short-wavelength nanosecond or picosecond laser having a predetermined value of energy and wavelength. Herein, the predetermined value can be set by being selected by those skilled in the art considering the application purpose of the laser. In the present embodiment, in order for the plasma shutter (PS) described later to operate in a range of wavelength and energy of the wide region, it is described that the nanosecond laser beam is generated by using Nd:YAG laser (Fundamental @1064 nm (IR), 2nd harmonic @532 nm (VIS), 3rd harmonic @355 nm (VIS-UV), and 4th harmonic @266 nm (UV)), which can generate the single-wavelength laser in the infrared-visible-ultraviolet region. The generated laser can be adjusted in the amount of light through a light amount adjustment unit (not shown) before passing through the beam splitter 100 described later, and therefore, the power or the energy of the laser can be adjusted. At this time, the light amount adjustment by the light amount adjustment unit can be continuously performed. The light amount adjustment unit can be a wave plate for continuously adjusting the focusing supply energy of the laser light source, and in the present embodiment, it is described that the wave plate is a half-wavelength wave plate. According to the present embodiment, it is possible to supply the focusing energy continuously changeable to the plasma forming unit 200 described later, while equally keeping the laser characteristics with the half-wavelength wave plate and the beam splitter.

The laser generated from the laser light source (not shown) can also be first stabilized through the injection seeding before passing through the beam splitter 100 described later. The high-energy laser for the application to ultra-precision machining or measurement should be able to control the temporal characteristics of the pulse at the accuracy within the picosecond, and when the injection seeding using a diode laser is used, it is possible to significantly improve the accuracy of high energy pulsed laser. The injection seeding can be performed through an injection seeder. The injection seeder can inject the output from the diode laser into a resonator of the main laser to stabilize the output of the laser. Herein, the main laser means a laser for generating the target pulse (TP) and the shutter pulse (SP). In order to stabilize the output of the main laser, the emitted laser light should be amplified and output in a single mode, and when the diode laser matched in mode to the resonator is supplied to a polarizing plate within the resonator, it is possible to attenuate the intensity of other longitudinal modes within the gain bandwidth, thereby enabling amplification in a single mode. Therefore, it is possible to shorten the time until laser emission after Q-switching, to significantly reduce the pulse-to-pulse deviation and the oscillation jitter of the laser pulse energy, and to generate the output profile smoothly and predictably on the time axis in the form of Gaussian.

The beam splitter 100 is disposed on the optical path through which the laser passes to transmit at least a part of the input laser and reflect at least a part thereof to divide the laser into a transmitted beam and a reflected beam. The laser generated from the laser light source can be divided into at least two while passing through the beam splitter 100. At this time, the divided laser can be classified into the target pulse (TP) and the shutter pulse (SP). Whether any one of the transmitted beam and the reflected beam generated from the beam splitter 100 becomes the target pulse (TP) and any one thereof becomes the shutter pulse (SP) can be determined while adjusting the laser path considering the portion at which the target pulse (TP) has been chopped. For example, as shown in FIG. 2, when it is desired to adjust the laser pulse width by chopping the second half of the target pulse (TP), the optical path length of the shutter pulse (SP) is required to be longer than the optical path length of the target pulse (TP), and at this time, the transmitted beam of the beam splitter 100 can become the target pulse (TP) and the reflected beam thereof can become the shutter pulse (SP). As a converse example, as shown in FIG. 3, when it is desired to adjust the laser pulse width by chopping the first half of the target pulse (TP), the optical path length of the target pulse (TP) is required to be longer than the optical path length of the shutter pulse (SP), and at this time, the transmitted beam of the beam splitter 100 can become the shutter pulse (SP) and the reflected beam thereof can become the target pulse (TP). Angles of the transmitted beam and the reflected beam are not specially limited thereto, and for example, can be divided to be perpendicular to each other.

The optical path conversion unit 110 converts the optical path of the reflected beam output from the beam splitter 100. Therefore, it is possible to relatively change the optical path length of two laser beams to precisely adjust the operation of the plasma shutter (PS). In addition, it is possible to form a point meeting each other by intersecting the paths of the reflected beam and the transmitted beam, and the target pulse (TP) can be deformed by the shutter pulse (SP) at this point. At this time, the angles of the reflected beam and the transmitted beam meeting each other are not specially limited thereto, and for example, can be perpendicular to each other.

The optical path conversion unit 110 can include at least one mirror 111. The mirror 111 is a mirror for reflecting the laser beam, and disposed on the input path output from the beam splitter 100 to reflect the input laser beam to the plasma forming unit 200 described later. The mirror 111 can be disposed considering the overall configuration of the device and the incident angles of the target pulse (TP) and the shutter pulse (SP) meeting each other later. In addition, the plurality of the mirrors 111 can also be disposed by being connected to each other to reflect the laser beam. In the present embodiment, it is described that the optical path of the reflected beam is converted by two mirrors 111, which can reflect so that the laser beam has the incident angle of 90°, in the optical path conversion unit 110. Herein, the reflected beam can be the target pulse (TP) or the shutter pulse (SP). The operation time of the plasma shutter (PS) can be adjusted by the distance (d) between the beam splitter 100 and the optical path conversion unit 110.

The plasma forming unit 200 can be disposed at a point where the reflected beam whose optical path has been adjusted by the optical path conversion unit 110 meets the transmitted beam output from the beam splitter 100, and include the material (T) capable of forming plasma therein. In order to transmit the laser beam as it is before forming the IB, the material (T) can by selected as a transparent material. In addition, since the high-temperature plasma formed by the IB phenomenon is generated by the high-energy laser having the pulse width of nanoseconds or more, it instantly becomes a high-temperature and high-pressure state of tens of thousands or more (>10,000K), such that a considerable amount of thermal energy and the chemical reaction by-products are present even after the plasma has been disappeared. In addition, the focusing of the continuous laser pulse gradually changes the material characteristics inside the plasma forming unit 200 as a result, and there is a problem in that this increases uncertainty that is difficult to predict in the precise operation of the plasma shutter. Therefore, the material forming plasma should be present in a flexible state, and supplied and removed always in a new state. In order to continuously perform the operation of opening and closing the IB shutter while solving the above-described problem, the material (T) can be selected as the refreshable fluid. In addition, in order to adjust the shutter delay, the fluid that the photon ionization adjustment is possible can be selected. The adjustment difficulty of the shutter operation can be changed according to the difficulty in performing the first ionization inside the plasma forming unit 200. The fluid can be gas or liquid, and in the present embodiment, it is described that it is a gaseous gas. The plasma forming unit 200 can be formed to include a fluid gate for flowing into and out the material (T). It is possible to variously control the characteristics of the material (T) that generates the focusing plasma, thereby operating the IB induction shutter of the desired form. With respect to the material (T) inside the plasma forming unit 200, the conditions such as the internal temperature and pressure should be constantly kept by making the flow, and for this adjustment, the material (T) should be continuously supplied at the same amount, pressure, and temperature through the precise adjustment.

The plasma forming unit 200 can become the adjustable internal pressure and include an optical window for transmitting the laser beam. For example, the plasma forming unit 200 can be a pressure cell or a Pockels cell, and the size of the pressure cell, shape, the fluid rate according to the laser radiation, a control method of the pressure and the temperature, and the internal fluid flow structure can be selected by those skilled in the art. In the present embodiment, it is described that the plasma forming unit 200 is an optical pressure cell in which the optical window has been formed on six surfaces thereof. In addition, it is described that the inlet and the outlet of the optical pressure cell are mounted with a valve in which choking is possible, and as necessary, a vacuum pump is connected to the outlet to perform a control capable of constantly keeping the internal pressure of the cell.

The plasma forming unit 200 receives the laser to form the plasma and induces the IB photon absorption phenomenon so that the laser chopping is performed. Specifically, the plasma forming unit 200 receives the continuously changeable focusing energy while equally keeping the laser characteristics with the light amount adjustment unit and the beam splitter to form the plasma induced from the shutter pulse (SP) so that the pulse width of the target pulse (TP) is adjusted. At this time, the light amount adjustment unit can be a half-wavelength wave plate.

The IB photon absorption phenomenon is induced in the optical pressure cell. That is, the IB phenomenon quickly absorbing most of the laser pulse energy can be caused by focusing the laser pulse in the cell. The fluid in the cell can be transparent in the wavelength of the laser transmitting before the IB phenomenon occurs and can become opaque when the IB is activated, thereby using the cell as a fast optical shutter. At this time, the operation time of the shutter largely receives the influence of the pressure of the cell, the characteristics of the material (T), and the laser pulse energy.

The type of the cell internal fluid, the cell internal pressure, the cell internal temperature, and the adjustment of the optical path are important in order to precisely control the operation of the shutter in the optical pressure cell. Among them, since the cell internal temperature is difficult to adjust and has a low effect, the other three factors are relatively considered more importantly. Among them, the length adjustment of the optical path for each laser beam can be performed through the optical path conversion unit 110 described above. The generation and development of the plasma shutter (PS) can be precisely controlled by variously controlling the incident angle of the laser beam and the characteristics of the plasma generating fluid.

The shutter pulse (SP) can react with the material (T) to induce the plasma forming from the shutter pulse (SP), and the IB due to the induced plasma can be operated as a shutter to adjust the pulse width of the target pulse (TP). Specifically, the optical shutter is closed by the IB photon absorption, and the target pulse (TP) can activate the IB photon absorption propagation-induced within the plasma inside the plasma forming unit 200 to perform the chopping of the target pulse (TP), and therefore, the pulse width of the target pulse (TP) can be adjusted. After providing a specific pressure condition to the fluid inside the cell, the shutter pulse (SP) can be condensed into the cell to generate the plasma to induce the IB phenomenon. At this time, since only the target pulse (TP) passing through the cell before the IB phenomenon starts is transmitted and the target pulse (TP) after the IB phenomenon has occurred does not transmit the cell, the chopping is made, and by using this, the picoseconds laser pulse can be formed from the target pulse (TP) that is the nanoseconds laser. At this time, the chopped portion of the target pulse (TP) is changed according to a change in the length of the optical path. For example, since the optical path of the shutter pulse (SP) is shorter than the optical path of the target pulse (TP), the chopping of the first half of the target pulse (TP) is performed when the plasma shutter (PS) is made before reaching the target pulse (TP). Since the disappearance of the plasma should be able to be additionally controlled in order to chop the first half of the target pulse (TP), the chopping of the first half of the target pulse (TP) is significantly higher than the chopping of the second half thereof in terms of technical difficulty. The pulse width of the target pulse (TP) is determined by the PAD, and the PAD determining the IB shutter time has the correlation according to the laser pulse energy and the fluid density in the cell, and this can be expressed by the function of the following Equation 1.

$$tPAD]\frac{1}{N}\left(\frac{1}{Isq}\right)^k\right]\frac{1}{N/No}\left(\frac{1}{E/Eo}\right)^k \quad \text{Equation 1}$$

(In the Equation 1, the tPAD refers to a photon absorption delay time, the N refers to a neutral molecule number density at the focus, the $N_o$ refers to a neutral molecule number density before the plasma is generated, the $I_{sq}$ refers to an average radiation intensity during the fixed time (tPAD) from the beginning of the laser radiation, the E refers to focusing laser pulse energy, $E_o$ refers to the generating limitation reference laser pulse energy of the atmospheric plasma, and the k refers to a collision ionization constant within the plasma forming unit changeable according to the type of the fluid.)

Referring to the Equation 1, since the pulse width of the transmitted laser beam is determined by the PAD time, the pulse width can be adjusted by variously controlling the energy and the fluid density in the cell. At this time, the laser beam whose pulse width has been shortened by being shortly chopped has a stiff peak shape, and the fluid heating due to having a higher power density is appeared lower. Considering this, it is possible to optimize the characteristics of the laser beam generated from the generating source for the purpose of the application thereof if using the pressure cell. For example, when applying the device according to an embodiment of the present disclosure, it is possible to make the nanoseconds laser as a shorter laser pulse by using the plasma shutter (PS), and in this case, since the rapid temperature rise of the material can be prevented, it is possible to precisely measure its characteristics while minimizing the deterioration of the measurement object material. Specifically, if it is used by chopping the nanoseconds laser into several-hundred picoseconds units by being applied to the conventional nanoseconds laser device, it is possible to accurately measure the density and the concentration of the gas without increasing the gas temperature and not causing the chemical reaction, and therefore, it is possible to stably measuring the physical property of the combustible gas. Therefore, the device according to an embodiment of the present disclosure can be used in various fields such as the optical, sensor, precision machining, and energy industrials.

In order to form the plasma, the shutter pulse (SP) should be focused while passing through the focusing unit 230 before being incident to the plasma forming unit 200. For this purpose, the focusing unit 230 can be disposed on the path of the shutter pulse (SP), and disposed to form the shutter pulse (SP)-induced plasma inside the plasma forming unit 200. The focusing unit 230 can be a focusing lens. The shutter pulse (SP) can be absorbed by a dump 300 after forming the plasma.

Figure 4:
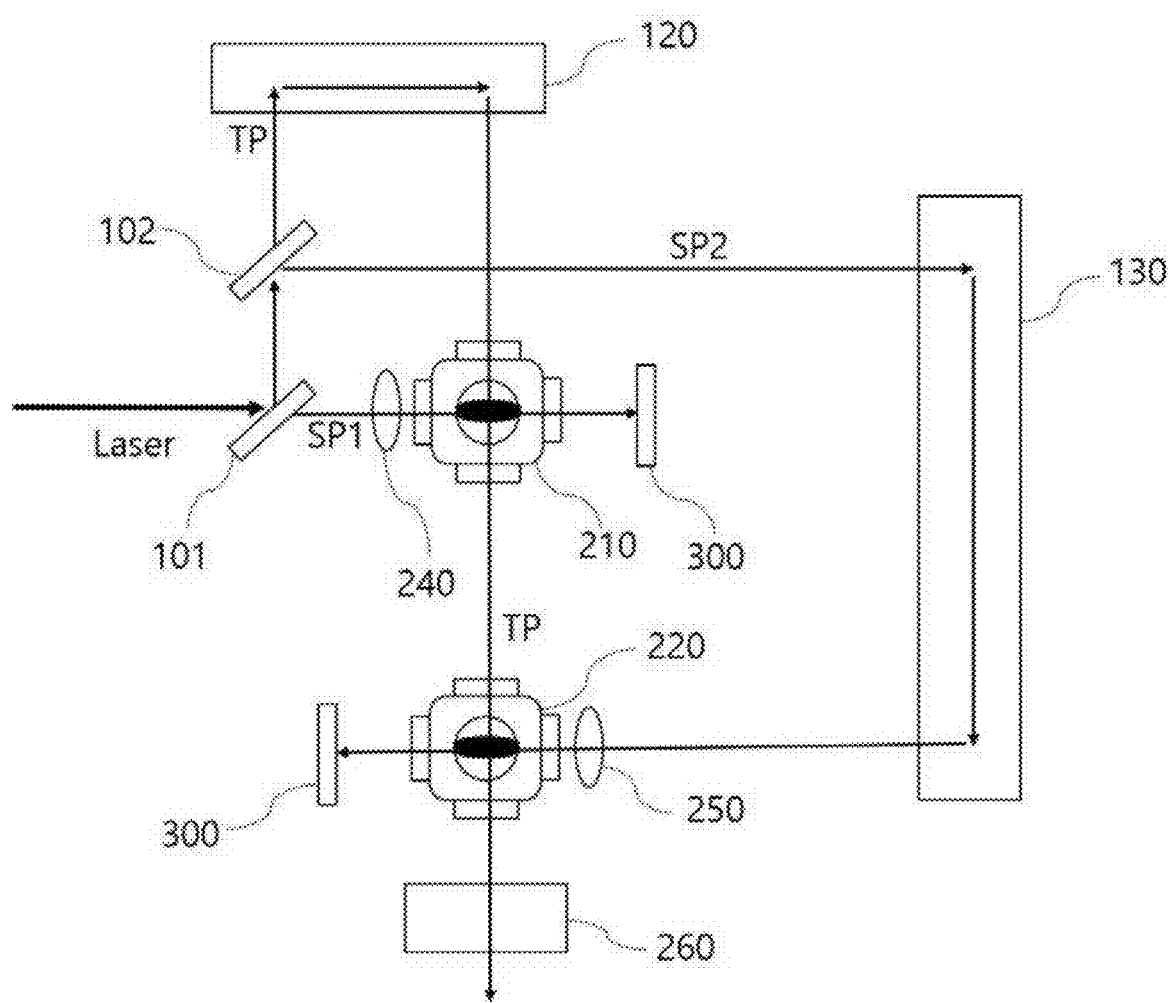
FIG. 4 is a diagram showing a structure of the device for adjusting the laser pulse width according to an embodiment of the present disclosure.

FIG. 4 is a diagram showing a configuration of a second embodiment of the device for adjusting the laser pulse width according to the present disclosure. The second embodiment of the device for adjusting the laser pulse width according to the present disclosure is for adjusting the laser by chopping the first half and the second half of the target pulse (TP), and referring to FIG. 4, includes beam splitters 101, 102; a first optical path conversion unit 120; a second optical path conversion unit 130; a first plasma forming unit 210; a second plasma forming unit 220; a first focusing unit 240; a second focusing unit 250; and a saturable absorber 260. In the following description of the present embodiment, a detailed description of the duplicative portion of the first embodiment will be omitted.

In addition, in the following description of the present embodiment, it is described that the laser generated from the light source through the beam splitter 100 is first divided into the target pulse (TP), a first shutter pulse (SP1), and a second shutter pulse (SP2) through the beam splitters 101, 102 and then post-processed, but by changing the order, the laser generated from the light source can first pass through the first beam splitter 101; the first optical path conversion unit 120; the first plasma forming unit 210; and the first focusing unit 240 to perform the chopping of the first half of the target pulse (TP), and then allow the target pulse (TP) whose first half portion has been chopped pass through the second beam splitter 102; the second optical path conversion unit 130; the second plasma forming unit 220; and the second focusing unit 250 to perform the chopping the second half of the target pulse (TP).

The laser emitted from the light source can be divided into the target pulse (TP), the first shutter pulse (SP1), and the second shutter pulse (SP2) through the beam splitters 101, 102. Herein, the first shutter pulse (SP1) means for forming the plasma for chopping the first half of the target pulse (TP) and the second shutter pulse (SP2) means for forming the plasma for chopping the second half of the target pulse (TP).

In the present embodiment, the beam splitters 101, 102 can be included in plural along the laser optical path. It is described that the present embodiment includes two beam splitters 101, 102 disposed to be spaced apart from each other along the optical path of the laser, and the laser is sequentially divided by the beam splitters 101, 102. For example, the transmitted beam formed while passing through the first beam splitter 101 can become the first shutter pulse, and the reflected beam can pass through the second beam splitter 102, and the transmitted beam formed while passing through the second beam splitter 102 can become the target pulse (TP), and the reflected beam can become the second shutter pulse. At this time, the distance between the beam splitters 101, 102 can be adjusted considering the length of the optical path for each divided laser beam.

The optical path of the divided laser can be formed to be lengthened in the order that the first shutter pulse (SP1) is the shortest, and the target pulse (TP) is the second shortest, and the second shutter pulse (SP2) is the longest before the chopping is performed due to the plasma shutter (PS), and this can be adjusted through the first optical path conversion unit 120 and the second optical path conversion unit 130 in addition to the beam splitters 101, 102. Specifically, the optical path of the target pulse (TP) can be converted through the first optical path conversion unit 120 so that the optical path of the first shutter pulse (SP1) is shorter than the optical path of the target pulse (TP) and both of them meet by intersecting each other, and the optical path of the second shutter pulse (SP2) can be converted through the second optical path conversion unit 130 so that the optical path of the second shutter pulse (SP2) is longer than the optical path of the target pulse (TP) and both of them meet by intersecting each other. Herein, the first plasma forming unit 210 capable of chopping the first half of the target pulse is formed at the point where the first shutter pulse (SP1) and the target pulse (TP) meet, and the second plasma forming unit 220 capable of chopping the second half of the target pulse is formed at the point where the second shutter pulse (SP2) and the target pulse (TP) meet. The first shutter pulse (SP1) and the second shutter pulse (SP2) can enter the plasma forming unit after focused for forming the plasma. The focusing of the first shutter pulse (SP1) and the second shutter pulse (SP2) is performed by the first focusing unit and the second focusing unit, respectively. The first plasma forming unit 210 and the second plasma forming unit 220 are disposed on the path of the target pulse (TP), and the order of transmitting the target pulse (TP) is not limited thereto.

The saturable absorber is disposed on the path of the target pulse (TP) to chop the second half of the target pulse (TP). Therefore, the pulse width of the target pulse (TP) can be additionally adjusted. The saturable absorber can act on the target pulse (TP) before or after the pulse width is adjusted by the plasma shutter, and the order is not limited thereto.

Figure 5:
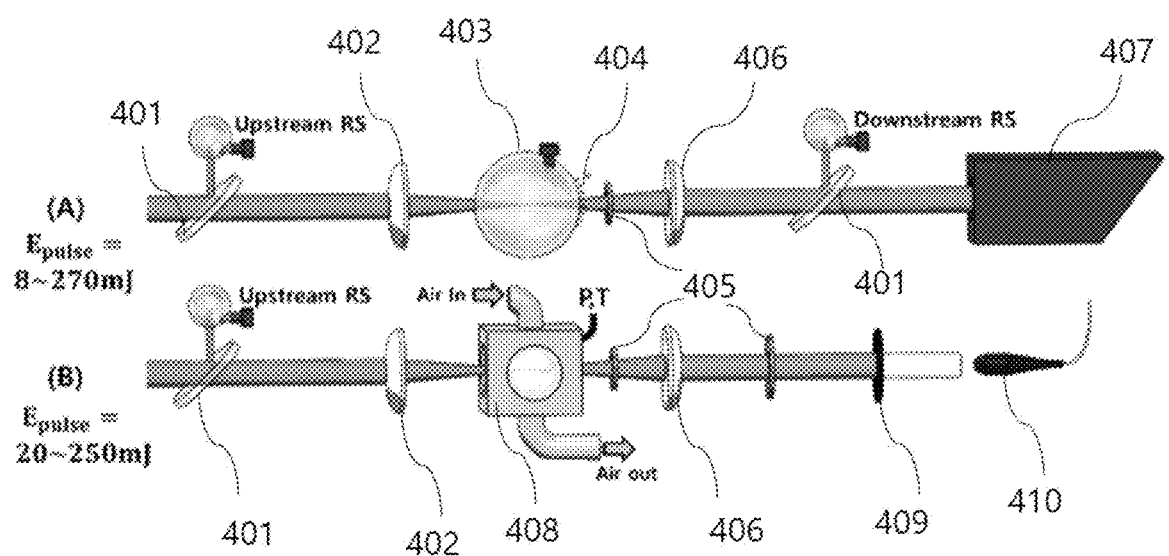
FIG. 5 is a diagram showing a configuration of an optical setup device for confirming the effect of the device for adjusting the laser pulse width according to an embodiment of the present disclosure.

FIG. 5 is a diagram showing a configuration of an optical setup device for confirming the effect of the device of an embodiment of the present disclosure. (A) is for inducing the atmospheric plasma in a reflector sphere to measure the scattered photon energy, and (B) is for focusing the laser pulse in the pressure cell (0.125 bar to 10 bar) in order to inspect the density dependence of the photon absorption behavior in the plasma.

Figure 6:
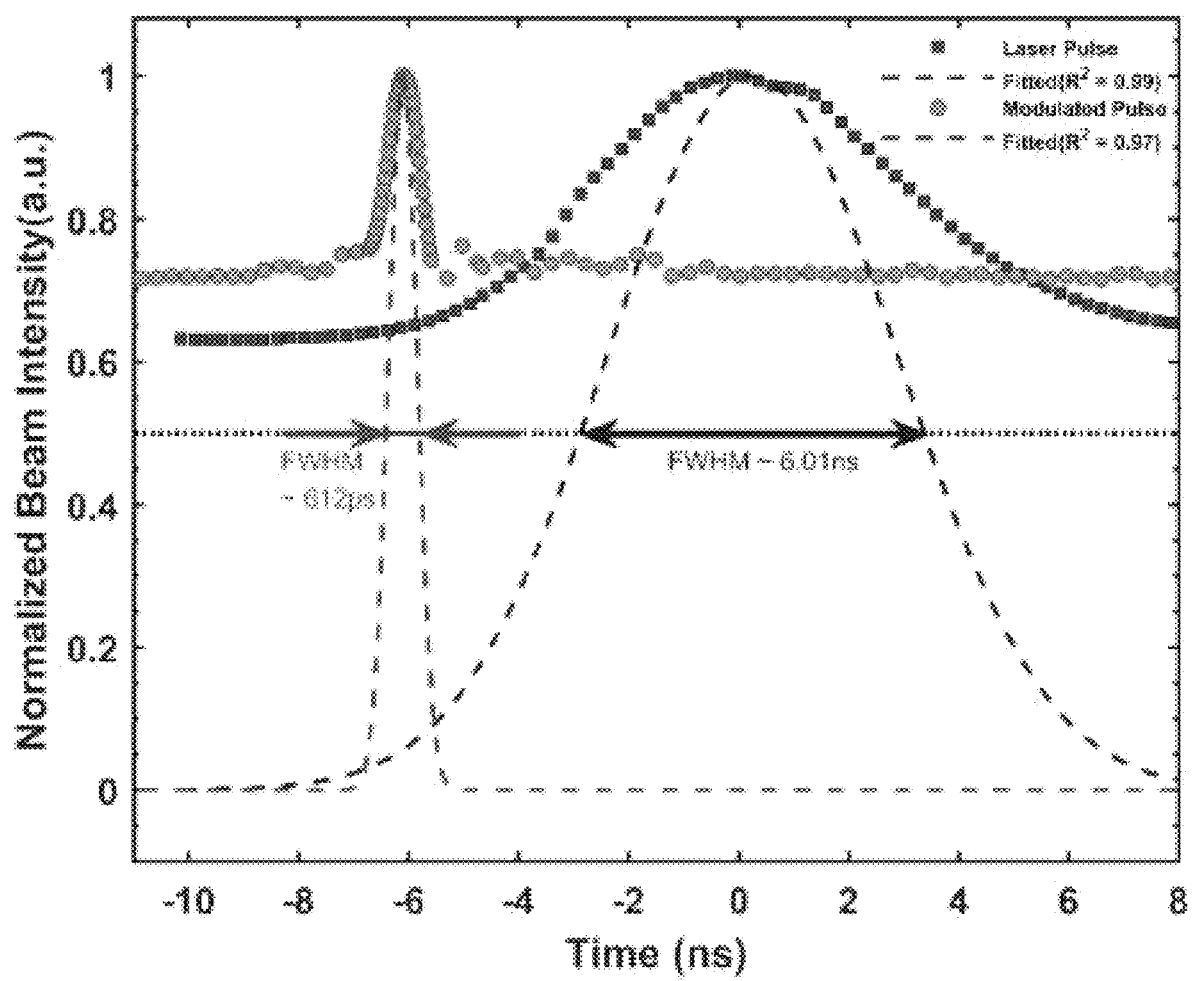
FIG. 6 is a diagram showing the fact that confirmed the short-wavelength laser pulse having the pulse width controlled by the device for adjusting the laser pulse width according to an embodiment of the present disclosure.

FIG. 6 is a diagram showing the fact that confirmed the single-wavelength laser pulse whose pulse width has been adjusted by the device of an embodiment of the present disclosure. In FIG. 6, the original nanoseconds laser pulse generated from the light source has been denoted by a square, and the laser pulse whose pulse width has been adjusted by the plasma shutter (PS) has been denoted by a circle. At this time, the condition of the pressure cell for forming the plasma shutter (PS) radiated the laser pulse having the energy of 250 mJ under a pressure of 10 bar. Referring to FIG. 6, it can be confirmed that the pulse width of the 6.01 nanoseconds units has been adjusted to 612 picoseconds units without changing the energy of the laser pulse.

Figure 7:
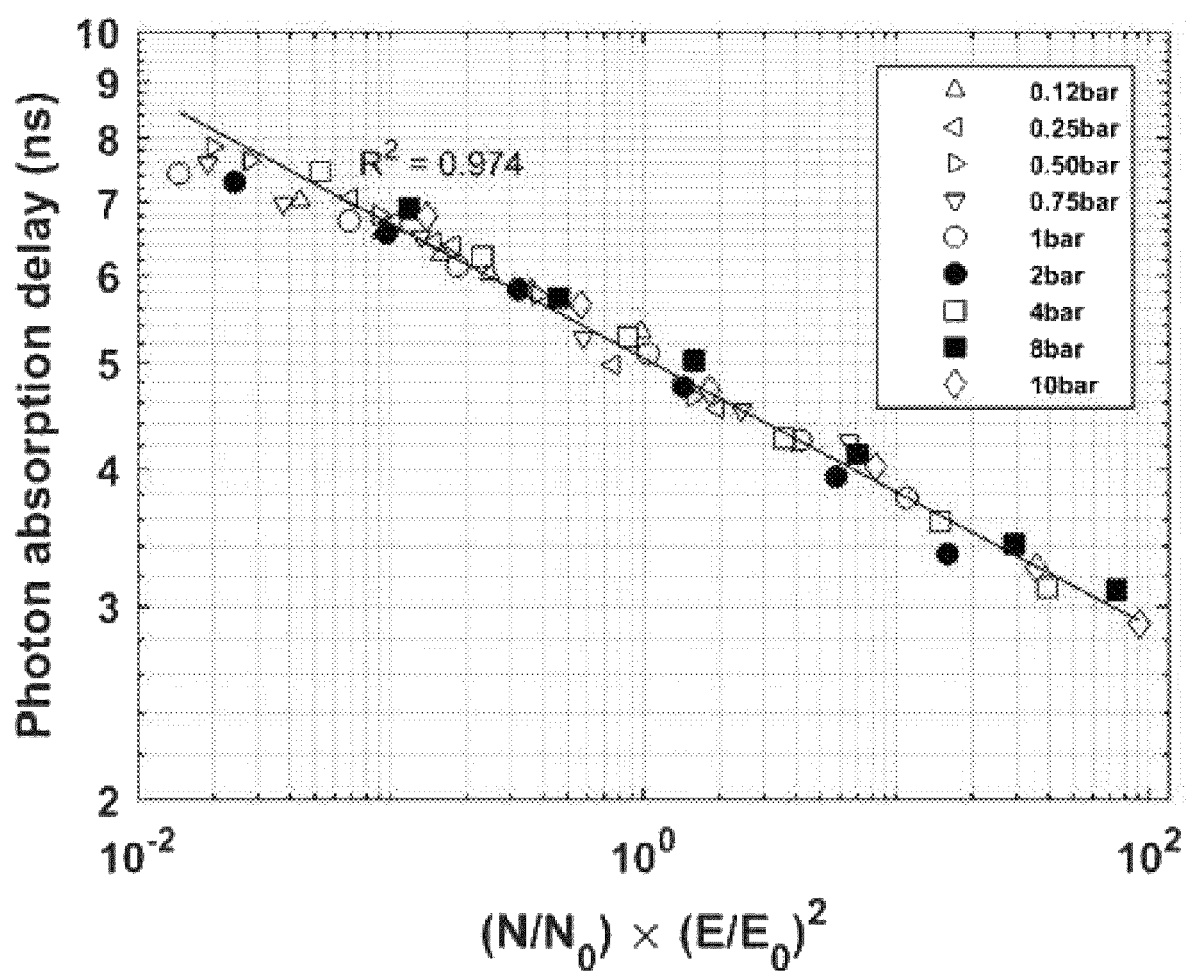
FIG. 7 is a diagram showing the fact that confirmed the influence of the fluid density (N) and the laser pulse energy (E) affecting tPAD in the device for adjusting the laser pulse width according to an embodiment of the present disclosure.

FIG. 7 is a diagram showing the fact that confirmed the influence of the fluid density (N) and the laser pulse energy (E) affecting tPAD, in the device of an embodiment of the present disclosure. The tPAD determining the pulse width of the transmitted laser beam was measured by various pressures and pulse energy. In FIG. 7, the $N_o$ is $0.33 \times 10-2$ atm/K, and the $E_o$ is 65 mJ. Referring to FIG. 7, it can be confirmed that the tPAD is reduced as the fluid density (N) and the laser pulse energy (E) increase.

Figure 8:
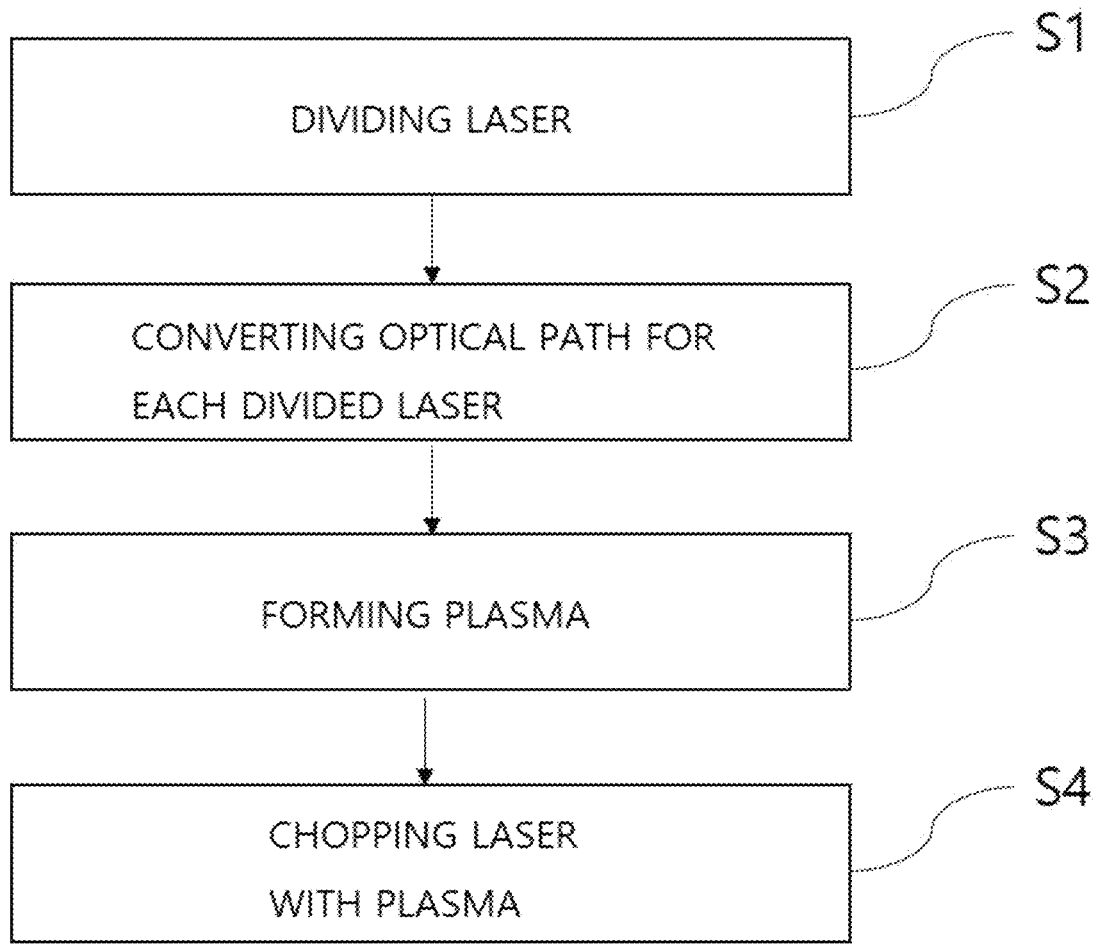
FIG. 8 is a flowchart of a method for adjusting the laser pulse width according to an embodiment of the present disclosure.

According to another aspect of the present disclosure, a method for adjusting the laser pulse width using the plasma shutter (PS) can be provided. An embodiment of the adjusting method was shown in FIG. 8. Referring to FIG. 8, an embodiment of the method for adjusting the laser pulse width of the present disclosure is performed by including dividing laser generated from the laser light source S1; converting the optical path for the divided laser S2; forming plasma from one divided laser S3; and chopping the other divided laser with the plasma S4. In the following description of the present embodiment, a detailed description of the duplicative description of the above-described portion will be omitted.

Firstly, the laser generated from the laser light source is divided into the target pulse (TP) and at least one shutter pulse (SP) S1. This can be performed through the beam splitter. The laser generated from the laser light source can be divided after being stabilized through the injection seeding.

Next, the converting the optical path of the target pulse (TP) or the shutter pulse (SP) is performed so that the path of the target pulse (TP) and the path of the shutter pulse (SP) intersect each other S2. The length of the optical path for each laser beam divided in the S2 is adjusted, and this adjustment can be performed considering the chopped peak portion of the target pulse (TP).

Next, the forming the plasma induced from the shutter pulse (SP) is performed at the point where the target pulse (TP) and the shutter pulse (SP) meet S3. The S3 and S4 described later can be performed in the environment where the pressure is adjusted, and the fluid is flowed-in and flowed-out. At this time, the fluid uses the fluid having transmission.

Next, the chopping the target pulse (TP) with the plasma induced from the shutter pulse (SP) is performed S4. The S4 is performed by the target pulse activating the IB photon absorption propagation-induced within the plasma. The target pulse (TP) is chopped through the IB photon absorption, and therefore, the pulse width of the target pulse (TP) is adjusted.

As necessary, passing through the saturable absorber before and after the target pulse (TP) is chopped with the plasma can be further performed. Therefore, the pulse width of the target pulse (TP) can be adjusted.

As described above, the present disclosure has specifically explained the preferred embodiment of the device and the method for adjusting the laser pulse width according to the present disclosure with reference to the accompanying drawings. However, an embodiment of the present disclosure is not inevitably limited to the above-described preferred embodiment, and it is natural that those skilled in the art to which the present disclosure pertains can practice it within the scope of various deformations and equivalents. Therefore, the pure scope of the present disclosure will be defined by the claims described later.

What is claimed is:

1. A device for adjusting a laser pulse width, comprising:
   a beam splitter for dividing the laser generated from a laser light source into a target pulse and a shutter pulse;
   an optical path conversion unit capable of converting the optical path of the target pulse or the shutter pulse so that the path of the target pulse and the path of the shutter pulse intersect each other;
   a plasma forming unit having adjustable internal pressure, and disposed at a point where the target pulse and the shutter pulse meet each other and capable of forming the plasma induced from the shutter pulse to adjust the pulse width of the target pulse; and
   a focusing unit disposed on the path of the shutter pulse, and for focusing the shutter pulse so that the plasma induced from the shutter pulse is formed within the plasma forming unit.

2. The device for adjusting the laser pulse width of claim 1,
   wherein the plasma forming unit chops the target pulse to adjust the pulse width by the target pulse activating the inverse-Bremsstrahlung photon absorption propagation-induced within the plasma therein.

3. The device for adjusting the laser pulse width of claim 1,
   wherein the laser generated from the laser light source is stabilized through an injection seeding.

4. The device for adjusting the laser pulse width of claim 1,
   wherein the plasma forming unit is a pressure cell.

5. The device for adjusting the laser pulse width of claim 1,
   wherein transparent fluid flows into and flows out from the plasma forming unit.

6. The device for adjusting the laser pulse width of claim 1, further comprising a light amount adjustment unit for continuously adjusting the light amount of the laser generated from the laser light source,
   wherein the continuously changeable focusing energy is supplied to the plasma forming unit while equally keeping the laser characteristics with the light amount adjustment unit and the beam splitter.

7. The device for adjusting the laser pulse width of claim 1, further comprising a saturable absorber disposed on the path of the target pulse, and disposed to be passed through by the target pulse before or after passing through the plasma forming unit.

8. A device for adjusting a laser pulse width, comprising:
   at least one beam splitter for dividing the laser generated from a laser light source into a target pulse, a first shutter pulse, and a second shutter pulse;
   a first optical path conversion unit for intersecting the paths of the first shutter pulse and the target pulse, and capable of converting the optical path of the target pulse so that the optical path of the first shutter pulse is shorter than the optical path of the target pulse;
   a second optical path conversion unit for intersecting the paths of the second shutter pulse and the target pulse, and capable of converting the optical path of the second shutter pulse so that the optical path of the second shutter pulse is longer than the optical path of the target pulse;
   a first plasma forming unit having adjustable internal pressure, disposed at a point where the target pulse and the first shutter pulse meet each other, and capable of forming the plasma induced from the first shutter pulse to chop the first half of the target pulse;
   a second plasma forming unit having adjustable internal pressure, disposed at a point where the target pulse and the second shutter pulse intersect each other, and capable of forming the plasma induced from the second shutter pulse to chop the second half of the target pulse;
   a first focusing unit disposed on the path of the first shutter pulse, and for focusing the first shutter pulse so that the plasma induced from the first shutter pulse is formed within the first plasma forming unit; and
   a second focusing unit disposed on the path of the second shutter pulse, and for focusing the second shutter pulse so that the plasma induced from the second shutter pulse is formed within the second plasma forming unit.

9. The device for adjusting the laser pulse width of claim 8,
   wherein the first plasma forming unit and the second plasma forming unit chop the target pulse to adjust the pulse width by the target pulse activating the inverse-Bremsstrahlung photon absorption propagation-induced within the plasma therein.

10. The device for adjusting the laser pulse width of claim 8,
wherein the laser generated from the laser light source is stabilized through an injection seeding.

11. The device for adjusting the laser pulse width of claim 8,
wherein the first plasma forming unit and the second plasma forming unit are pressure cells.

12. The device for adjusting the laser pulse width of claim 8,
wherein transparent fluid flows into and flows out from the first plasma forming unit and the second plasma forming unit.

13. The device for adjusting the laser pulse width of claim 8, further comprising a light amount adjustment unit for continuously adjusting the light amount of the laser generated from the laser light source.

14. The device for adjusting the laser pulse width of claim 8, further comprising a saturable absorber disposed on the path of the target pulse.

15. A method for adjusting a laser pulse width, comprising:
a first stage dividing the laser generated from a laser light source into a target pulse and at least one shutter pulse;
a second stage converting the optical paths of the target pulse or the shutter pulse so that the path of the target pulse and the path of the shutter pulse intersect each other;
a third stage forming plasma induced from the shutter pulse at a point where the target pulse and the shutter pulse meet each other; and
a fourth stage chopping the target pulse with the plasma and adjusting a pulse width.

16. The method for adjusting the laser pulse width of claim 15,
wherein the fourth stage is performed by the target pulse activating the inverse-Bremsstrahlung photon absorption propagation-induced within the plasma.

17. The method for adjusting the laser pulse width of claim 15,
wherein the laser generated from the laser light source is stabilized through an injection seeding.

18. The method for adjusting the laser pulse width of claim 15,
wherein the third stage and the fourth stage are performed in the environment where pressure is adjusted.

19. The method for adjusting the laser pulse width of claim 15,
wherein the third stage and the fourth stage are performed in the environment where transparent fluid flows into and flows out.

20. The method for adjusting the laser pulse width of claim 15,
wherein the target pulse passes through a saturable absorber before and after being chopped with the plasma to be additionally chopped to adjust the pulse width.

* * * * *